A. BECKWITH.
Assignor to E. W. DAVENPORT & J. A. CHURCHILL.
Horse-Collar.
No. 8,358. Reissued Aug. 6, 1878.
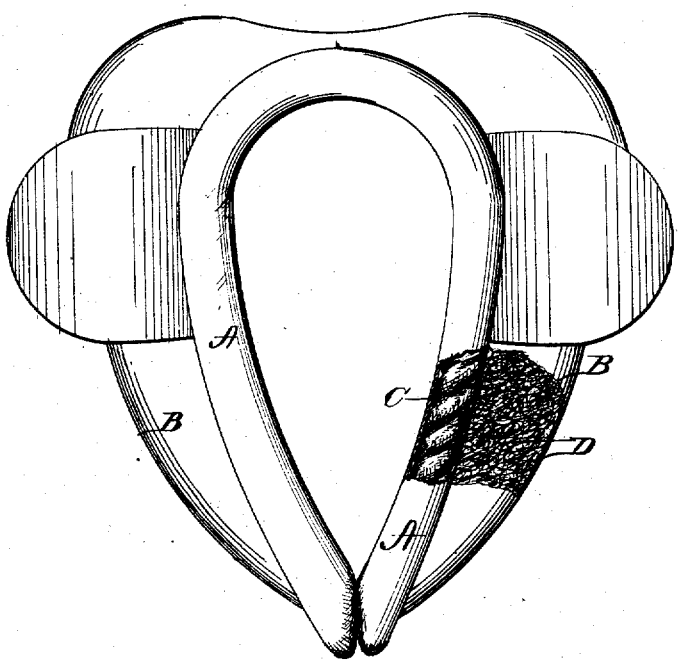
Witnesses.
F. L. Ourand
J. J. McCarthy.
Inventor
Amos Beckwith
Alexander Mitchell
Attorneys
N. PETERS, PHOTO-LITHOGRAPHER, WASHINGTON, D. C.

UNITED STATES PATENT OFFICE.

AMOS BECKWITH, OF ST. LOUIS, MISSOURI, ASSIGNOR TO E. W. DAVENPORT AND J. A. CHURCHILL, OF SAME PLACE.

IMPROVEMENT IN HORSE-COLLARS.

Specification forming part of Letters Patent No. 97,592, dated December 7, 1869; Reissue No. 8,358, dated August 6, 1878; application filed July 10, 1878.

*To all whom it may concern:*

Be it known that I, A. BECKWITH, of the city of St. Louis, in the county of St. Louis and State of Missouri, have invented certain new and useful Improvements in Horse-Collars; and I do hereby declare that the following is a full, clear, and exact description thereof, reference being had to the accompanying drawings, and to the letters of reference marked thereon, which form a part of this specification.

The nature of my invention consists in making the rim of a horse-collar of rope inclosed within a covering, the object being to provide for public use a cheap, substantial, and durable collar, and which will be easier for the neck of the horse than those heretofore employed.

The annexed drawing represents a front view of a horse-collar embodying my invention, a portion being broken away to reveal the internal construction of the collar.

A represents the rim, and B B the pads of the collar. The rim is stuffed or filled with rope, as shown at C, while the pads are stuffed or filled with moss, straw, or other similar material, as represented at D. The materials C and D, which form the rim and pads, respectively, are inclosed within a covering of proper shape, and I find that a covering of canvas or duck is much more inexpensive than a leather covering.

The collar may be made open at the top, with a buckle to secure it, or it may be closed at the top entirely.

The rope C may be the ordinary twist rope, made from cotton, flax, hemp, leather, or other material from which rope can be manufactured, and it may be made, in the ordinary way, by torsion; or the fibers may be made longitudinally and wrapped and secured, according to the fancy of the manufacturer.

The most important advantage in this improvement consists in the self adaptability and adjustability of the rope, and consequently of the entire collar, to the neck of the animal. At the same time the collar may be manufactured cheaper than any heretofore brought before the public, since it can be manufactured for twenty-five cents, whereas the cheapest collar for plantation use ever before in the market has not cost less than one dollar. In fact, any person of ordinary mechanical skill can easily manufacture collars for his own use at a mere nominal cost.

The moss is furnished in abundance from trees growing in the South, and when the covering is of canvas it can easily be fashioned and sewed together by an inexperienced hand.

Having thus fully described my invention, what I claim as new, and desire to secure by Letters Patent, is—

1. A horse-collar having a rope foundation for the rim, substantially as set forth.

2. In a horse-collar, a rope foundation for the rim, and pads of moss, straw, or similar material, the whole being inclosed in a covering, substantially as set forth.

In testimony that I claim the foregoing I have hereunto set my hand this 13th day of June, 1878.

A. BECKWITH.

Witnesses:
JOHN CANNON,
W. H. SMITH.